(12) United States Patent
Dlapka et al.

(10) Patent No.: US 10,919,093 B2
(45) Date of Patent: Feb. 16, 2021

(54) METHOD FOR THE PRODUCTION OF A SINTERED GEAR

(71) Applicant: Miba Sinter Austria GmbH, Laakirchen (AT)

(72) Inventors: Magdalena Dlapka, Voecklabruck (AT); Christian Dumanski, Plesching-Steyregg (AT); Karl Dickinger, Vorchdorf (AT); Martin Heissl, St. Florian (AT)

(73) Assignee: Miba Sinter Austria GmbH, Laakirchen (AT)

( * ) Notice: Subject to any disclaimer, the term of this patent is extended or adjusted under 35 U.S.C. 154(b) by 665 days.

(21) Appl. No.: 15/630,209

(22) Filed: Jun. 22, 2017

(65) Prior Publication Data

US 2018/0015546 A1 Jan. 18, 2018

(30) Foreign Application Priority Data

Jul. 15, 2016 (AT) .............. A 50632/2016

(51) Int. Cl.
| | | |
|---|---|---|
| *B22F 5/08* | (2006.01) | |
| *B22F 3/16* | (2006.01) | |
| *B22F 3/24* | (2006.01) | |
| *B29C 35/02* | (2006.01) | |
| *C21D 1/18* | (2006.01) | |
| *C21D 1/613* | (2006.01) | |
| *C21D 9/32* | (2006.01) | |
| *C22C 38/22* | (2006.01) | |
| *C23C 8/22* | (2006.01) | |
| *C23C 8/80* | (2006.01) | |
| *B29K 21/00* | (2006.01) | |
| *B29K 705/12* | (2006.01) | |
| *B29L 15/00* | (2006.01) | |

(52) U.S. Cl.
CPC ............... *B22F 5/08* (2013.01); *B22F 3/16* (2013.01); *B22F 3/24* (2013.01); *B29C 35/02* (2013.01); *C21D 1/18* (2013.01); *C21D 1/613* (2013.01); *C21D 9/32* (2013.01); *C22C 38/22* (2013.01); *C23C 8/22* (2013.01); *C23C 8/80* (2013.01); *B22F 2003/242* (2013.01); *B22F 2003/248* (2013.01); *B22F 2998/10* (2013.01); *B22F 2999/00* (2013.01); *B29K 2021/00* (2013.01); *B29K 2705/12* (2013.01); *B29L 2015/003* (2013.01)

(58) Field of Classification Search
CPC ...... B22F 5/00; B22F 5/08; B22F 3/16; B22F 3/24; B29C 35/02; C21D 1/18; C21D 1/613; C21D 9/32
See application file for complete search history.

(56) References Cited

U.S. PATENT DOCUMENTS

| | | | |
|---|---|---|---|
| 4,184,380 A | 1/1980 | Rivin | |
| 5,390,414 A * | 2/1995 | Lisowsky | B22F 5/08 |
| | | | 29/893.34 |
| 5,785,771 A * | 7/1998 | Mitchell, Jr. | C23C 8/04 |
| | | | 148/213 |
| 9,121,494 B2 | 9/2015 | Buchleitner | |
| 9,856,964 B2 * | 1/2018 | Dumanski | F16H 55/17 |
| 2006/0099105 A1 * | 5/2006 | Engstrom | C22C 33/0264 |
| | | | 419/39 |
| 2009/0317582 A1 * | 12/2009 | Schmid | B22F 3/24 |
| | | | 428/66.1 |
| 2015/0226303 A1 | 8/2015 | Dumanski | |
| 2015/0226304 A1 | 8/2015 | Dumanski et al. | |

FOREIGN PATENT DOCUMENTS

| | | | | |
|---|---|---|---|---|
| AT | 508 701 B1 | 3/2011 | | |
| AT | 514 570 B1 | 2/2015 | | |
| AT | 514 590 B1 | 2/2015 | | |
| CN | 101545526 A * | 9/2009 | | |
| CN | 102537103 A | 7/2012 | | |
| DE | 201 11 493 U1 | 11/2002 | | |
| GB | 511 298 A | 8/1939 | | |
| GB | 511298 A * | 8/1939 | | F04C 2/084 |
| WO | 2016/041977 A1 | 3/2016 | | |

OTHER PUBLICATIONS

Packham, D. E.. (2005). Handbook of Adhesion (2nd Edition). John Wiley & Sons. (Year: 2005).*
Chaturvedi, M.C.. (2012). Welding and Joining of Aerospace Materials—8.3.2.2 Surface Treatment of Stainless Steel. (pp. 252). Woodhead Publishing. Retrieved from https://app.knovel.com/hotlink/pdf/id:kt00BUTEG1/welding-joining-aerospace/surface-treatment-stainless (Year: 2012).*
"Wash." Merriam-Webster.com. 2020. https://www.merriam-webster.com/dictionary/wash (Feb. 28, 2020). (Year: 2020).*
Huang et al. "Low-noise gear", 2009. Machine-translation of CN-101545526-A (Year: 2009).*

* cited by examiner

*Primary Examiner* — Alexandra M Moore
(74) *Attorney, Agent, or Firm* — Collard & Roe, P.C.

(57) ABSTRACT

The invention relates to a method for producing a sintered gear comprising a gear body on which at least one elastomer element is arranged, according to which a green compact is produced by pressing a powder, the green compact is sintered into a gear body and is hardened by carburization and subsequent quenching or sinter-hardening and subsequent quenching with a gas and afterwards the at least one elastomer element is vulcanized onto the gear body.

8 Claims, No Drawings

METHOD FOR THE PRODUCTION OF A SINTERED GEAR

CROSS REFERENCE TO RELATED APPLICATIONS

Applicant claims priority under 35 U.S.C. § 119 of Austrian Application No. A 50632/2016 filed on Jul. 15, 2016, the disclosure of which is incorporated by reference.

The invention relates to a method for producing a sintered gear comprising a gear body on which at least one elastomer element is arranged, according to which a green compact is produced by pressing a powder, the green compact is sintered into a gear body and is hardened by carburization and subsequent quenching or sinter-hardening and subsequent quenching and afterwards the least one elastomer element is vulcanized onto the gear body.

Sintered gears with elastomer elements are already known from the prior art. The elastomer elements are used for a variety of different purposes. For example, AT 508 701 B1 describes a split gear arrangement with spring elements vulcanized onto the latter. Said spring elements are used for pretensioning in the circumferential direction of the rotatable gear against the fixed gear.

AT 514 570 B1 and AT 514 590 B1 describe gears which are split in radial direction, in which the two gear parts are joined together by vulcanized elastomer rings.

A common feature of said gears is that the elastomer elements are subjected to high loading during the operation of the gears. In particular, if the elastomer elements are exposed to partly alternating pushing and puling forces, the connecting point between the metal and elastomer is very important as there is a risk that the elastomer elements will become detached when subjected to excessive stress.

Therefore, for the production of gears with vulcanized elastomer elements expensive and complex processing steps are required for the gears in order to achieve a high adhesive strength of the elastomer element on the metal main gear body.

On the basis of the latter the objective of the invention is to provide a simpler or less expensive way of producing a sintered gear which provides at least the same adhesive strength of the elastomer element to the metal base as in the prior art.

The objective of the invention is achieved with the aforementioned method in that the hardened gear body is quenched with gas.

By means of gas quenching, generally fluid cooling media and quenching oils are avoided. In this way such fluid media are prevented from collecting in the pores of the sintered gear and having to be removed from said pores afterwards with great difficulty. The gear body is thus already dry after thermal processing and gas quenching so that it can be supplied directly, without further processing, to the stage of vulcanizing the elastomer element. Although due to the lack of possible vaporization of the cooling medium the gas quenching is generally performed more slowly than oil quenching, the processing and technical advantage achieved in this way outweighs this disadvantage. A secondary effect of the slower quenching is that a lower core hardness is achieved so that a sintered gear is obtained which on the one hand has a relatively high degree of hardness in the areas close to the surface and which on the other hand also has a relatively high degree of toughness in the core and thus is better able to withstand alternating stresses.

According to one embodiment variant of the method it is possible that the carburization of the gear body is performed by means of low-pressure carburization. In this way the advantage is that even with sintered gears which are very narrow in axial direction compared to other carburization method, such as carbonitriding, very specific hardness profiles can be achieved. It is thus also possible to obtain a softer core in said sintered gears.

Preferably, a sinter-hardenable powder is used to produce the green compact. The use of sinter-hardenable powders supports avoiding the use of fluid cooling media to achieve relatively high hardnesses for the surface layers of the sintered gear exposed to wear. In addition in this way it is possible to achieve a better tooth quality and as a result the quiet running of the sintered gear.

Particularly preferably, a sinter-hardenable powder is used which includes a proportion of chromium of between 1 wt. % and 5 wt. %. The said effects can be improved further by means of the chromium. Chromium significantly improves the hardening effect during the described gas quenching.

According to a further embodiment variant of the method the gear body is compacted to a density of between 6.8 $g/cm^3$ and 7.4 $g/cm^3$. It is an advantage in this case that a particularly good level of strength can be produced in a very economical manner.

It is also possible for the gear body to be produced to have a roughness depth of its surface of between Rz1 and Rz10. In this way the adhesion of the elastomer element to the gear body can be increased significantly.

Preferably, the carburization is performed up to a depth of the gear body measured from its surface, which is selected from a range of 100 μm to 2000 μm, in particular up to a depth of 100 μm to 1000 μm, depending on the toothing geometry and the occurring Hertzian stress. In this way the wearing resistance can be improved significantly, as by means of the subsequent hardening a suitably highly hardened layer thickness can be provided. In this way there can be an improvement in the adhesion of the elastomer element to the gear body.

According to a further embodiment variant of the method the gas quenching is performed using N2, N2/H2 or He as the gas. The use of N2, N2/H2 or He over other gases has the advantage that in this way higher cooling rates can be achieved.

The gear body can be cooled at a quenching speed selected from a range of 1° C./s to 7° C./s. In this way an at least partly martensitic structure is formed.

For a better understanding of the invention the latter is explained in more detail with reference to the following description.

The invention relates to a method for producing a sintered gear.

The sintered gear can for example be a sintered gear for a clinching drive, such as in particular a sprocket, or a sintered gear for a gear drive, in which the sintered gear meshes with at least one further gear. It can also comprise a spur toothing or a helical gearing. Preferably, the sintered gear has a spur toothing. The sintered gear can also comprise one or more spur(s).

Furthermore, the sintered gear comprises at least one elastomer element which is vulcanized onto the metal gear body of the sintered gear.

In the preferred embodiment variant a sprocket is produced which in axial direction comprises an elastomer spur on one or both sides (directly) next to the toothing for the chain drive. The elastomer spur can be designed to have depressions and (nub-like) elevations. The elastomer spur is used for damping the sound during the running-in of the chain into the toothing of the sprocket spur. Preferably, the elastomer spur extends continuously around the whole circumference of the gear body.

The elastomer element is made at least partly from a rubber elastic material, for example an (X)NBR ((carboxylated) acrylonitrile butadiene rubber), HNBR (hydrogenated nitrile butadiene rubber), a silicon rubber (VMQ), EPDM (ethylene propylene diene rubber), CR (chloroprene rubber), SBR (styrene butadiene rubber) etc., wherein mixtures of materials can also be used.

The term "at least partly" means that for example reinforcing elements such as e.g. fibers and/or particles, made of metal, plastic, natural fibers etc. or rods for example, can be embedded into the elastomer element. Preferably, the elastomer element is made solely from a rubber-elastic material.

The metal gear body is produced according to a powder metallurgic method (sintering method). Such methods are already very well-known from the prior art so that the main features of this method do not need to be explained in detail here. An explanation is only provided to the extent that the method comprises essentially the steps of mixing the powder, pressing the powder into a green compact, dewaxing and sintering the green compact in one or multiple steps to form the gear body.

In the process for producing the sintered gear the gear body is also hardened by carburization and subsequent, controlled cooling or by sinter-hardening. By means of carburization the amount of carbon in the gear body is increased. The carburization can be performed after sintering or during the sintering.

In principle the carburization can be performed by various different methods, whereby a common feature of each method is that a gas or gas mixture is used as the carbon source. For example, methane, propane, acetylene etc. can be used as the gas.

The carburization can be performed for example by means of carbonitriding. Preferably however, the carburization is performed by means of a low-pressure carburization method.

The carbon content of the gear body is preferably between 0.4 wt. % and 1.0 wt. % after carburization.

In particular, the carburization is performed up to a depth of the gear body, measured from its surface, which is selected from a range of 100 µm to 2000 µm; preferably from a range of 100 µm to 1000 µm. The aforementioned, preferred content of carbon relates to said carburization depth. Lower ranges of the gear body thus indicate a lower carbon content.

If necessary, after the sintering and/or after the hardening it is possible to carry out mechanical post-processing.

After the hardening the at least one elastomer element is vulcanized (directly) onto the metal gear body. In this case a bonding agent (1K component or 2 component system) can be applied directly onto the powder metallurgical gear without further washing operations after a jetting process (e.g. iron grit, steel shot, sand, carborundum, grain sizes in the range of 0.6 to 1 mm) (as rapidly as possible in order to avoid the formation of oxides). By having a dry and clean gear body it is possible to achieve an improved adhesion to the metal in that the greatest possible active surface can be provided. The type of bonding agent is dependent on the materials to be joined. The bonding agent is selected so that it has a lower surface tension than the metal surface in order to enable complete wetting.

After drying the bonding agent, at a temperature of between 90° C. and 250° C. over a time period of 1 minute to 20 minutes the elastomer is vulcanized on. It is an advantage if no fluid escapes in the form of oil or hard emulsion, as the bonding agent otherwise becomes less effective. The method according to the invention is advantageous particularly in these critical steps as the vulcanization is performed using completely dry, powder metallurgical components. The temperature is selected in particular so that afterwards the required surface hardness from the thermal processing of the sintered steel is maintained.

To improve the adhesive strength of the elastomer element on the metal gear body, the hardened gear body is quenched after carburization with a gas.

Preferably, the gas quenching is performed with N2, N2/H2 or He as the gas.

According to one embodiment variant it is also possible that the gear body is quenched at a quenching speed which is selected from a range of 1° C./s to 7° C./s, Preferably, the at least one elastomer element is vulcanized onto the gear body immediately after the quenching.

According to a preferred embodiment variant of the method it is possible to use a sinter-hardenable powder to produce the green compact. The latter could be an iron or steel powder which comprises at least a proportion of an alloy element which delays the eutectoid conversion of austenite to ferrite and perlite. For example, the powder can comprise a proportion of chromium, nickel and/or molybdenum. The proportion of the at least one element in the powder for producing the green compact can be between 0.4 wt. % and 5 wt. %.

In the preferred embodiment variant of the method chromium is added as the alloy element in order to obtain the sinter-hardenable powder. The proportion of chromium in the powder can thus be between 1 wt. % and 5 wt. %.

For example, powders can be used in the method with the following composition: Fe+1.8% Cr+0.2% C; or Fe+3% Cr+0.5% Mo+0.2% Cr It is also preferred if the gear body is compacted to a density of between 6.8 g/cm$^3$ and 7.4 g/cm$^3$. For this the surface can be compacted after sintering by means of rollers or the whole cross-section can be compacted after sintering during the calibration. However a suitable density can also be achieved at the pressing stage.

According to another embodiment variant the gear body can be produced to have a surface roughness depth according to DIN EN ISO 4287:1998 and DIN EN ISO 11562:1998 which is between Rz1 and Rz10. This can be performed for example by pressing and sintering, or press-sintering and additional compaction methods.

In the following several examples are given for the production of the sintered gear.

Such a powder-metallurgical gear is produced by compacting a Cr pre-alloyed powder with a composition of Fe+3% Cr+0.5% Mo+0.5% C or also Fe+1.8% Cr+2% Ni+0.5% C to a density of between 6.8 g/cm$^3$ and 7.3 g/cm$^3$. The following sintering is performed at a sintering temperature of between 1120° C. and 1300° C. in a N2/H2/C atmosphere for about 10 minutes to 30 minutes to temperature. The subsequent cooling is performed by means of quenching from the sintering heat by means of gas quenching, wherein depending on the temperate range cooling rates are achieved of between 1° C./s and 7° C./s. The thereby sinter-hardened components have at least partly a martensitic structure, and do not require any additional hardening. The surface roughness Rz here is about 5.

A further way of producing such a powder metallurgical gear is performed by compacting a Cr pre-alloyed powder with a composition of Fe+1.8% Cr+0.2% C or also Fe+1.8% Cr+2% Ni+0.2% C to a density of between 6.8 g/cm$^3$ and 7.3 g/cm³. The subsequent sintering is performed at a sintering temperature of between 1120° C. und-1300° C. in a N2/H2 atmosphere for about 10 minutes to 30 minutes to temperature. Following the sintering in part the compaction of the whole cross-section of the component is adjusted during calibration or the surface is adjusted by means of rolling or calibration. The components are subjected to additional carburization in the form of low-pressure carburization with high-pressure gas quenching at 20 bar N2 or He. The surface roughness Rz of the surface is here about 2. A greater surface roughness turns out to be helpful for the adhesion.

In both processes vulcanization is performed afterwards without any further washing and/or chemical cleaning steps being necessary, as the components are completely dry and in particular are oil-free after the sinter-hardening.

The resulting adhesive strength between the metal and elastomer is analyzed by pressing tests. Pressing tests are carried out in which attempts are made to detach the rubber/metal connection by applying axial force to the sintered gear. The latter show results with particular geometries from >30 kN.

The example embodiments describe possible embodiment variants of the method, whereby it should be noted at this point that various different combinations of the individual embodiments are also possible.

The invention claimed is:

1. A method for producing a sintered gear comprising a gear body on which at least one elastomer element is arranged, the method comprising:
    producing a green compact by pressing a powder,
    sintering the green compact into a metal gear body,
    hardening the metal gear body by carburization and subsequent quenching or sinter-hardening and subsequent quenching,
    subjecting the hardened metal gear body to a jetting process,
    applying a bonding agent directly onto the hardened metal gear body without further washing operations,
    drying the bonding agent thereafter, and
    vulcanizing the at least one elastomer element onto the hardened metal gear body at a temperature of between 90° C. and 250° C. over a time period of 1 minute to 20 minutes,
    wherein the subsequent quenching of the hardened metal gear body is quenched quenching with a gas.

2. The method as claimed in claim 1, wherein a sinter-hardenable powder is used to produce the green compact.

3. The method as claimed in claim 2, wherein a sinter-hardenable powder is used which includes a proportion of chromium which is between 1 wt. % and 5 wt. %.

4. The method as claimed in claim 1, wherein the gear body is compacted to a density of between 6.8 g/cm³ and 7.4 g/cm³.

5. The method as claimed in claim 1, wherein the gear body is produced to have a roughness depth on its surface which is between Rz1 and Rz10.

6. The method as claimed in claim 1, wherein the carburization is performed to a depth of the gear body, measured from its surface, which is selected from a range of 100 μm to 2000 μm.

7. The method as claimed in claim 1, wherein the subsequent gas quenching of the hardened metal gear body is performed with N2, N2/H2 or He as the gas.

8. The method as claimed in claim 1, wherein the subsequent quenching of the hardened metal gear body is performed at a quenching speed which is selected from a range of 1° C./s to 7° C./s.

* * * * *

UNITED STATES PATENT AND TRADEMARK OFFICE
CERTIFICATE OF CORRECTION

PATENT NO. : 10,919,093 B2
APPLICATION NO. : 15/630209
DATED : February 16, 2021
INVENTOR(S) : Dlapka et al.

Page 1 of 1

It is certified that error appears in the above-identified patent and that said Letters Patent is hereby corrected as shown below:

In the Claims

In Claim 1, Line 19 (Column 6, Line 11), after "is" please delete "quenched".

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*